April 9, 1935.   E. W. KREBS   1,997,464
BRAKING SYSTEM FOR ELECTRIC MOTORS
Filed June 18, 1934
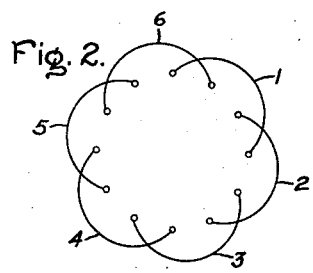
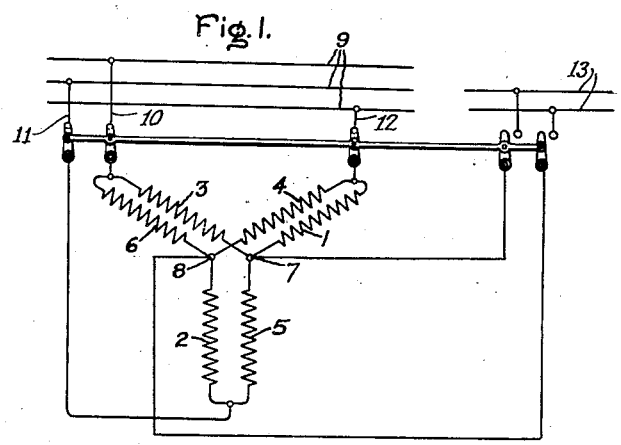
Inventor:
Ernst W. Krebs,
by Harry E. Dunham
His Attorney.

Patented Apr. 9, 1935

1,997,464

UNITED STATES PATENT OFFICE 1,997,464

BRAKING SYSTEM FOR ELECTRIC MOTORS

Ernst Wolfgang Krebs, Berlin-Charlottenburg, Germany, assignor to General Electric Company, a corporation of New York Application June 18, 1934, Serial No. 731,141
In Germany July 4, 1933

3 Claims. (Cl. 172—274)

This invention relates to braking systems for electric motors, more particularly to systems for effecting dynamic braking of an asynchronous alternating current motor and it has for an object the provision of a simple, reliable and improved system of this character.

Heretofore, in connections for the direct current braking of asynchronous motors, with the secondary winding short-circuited, the direct voltage has been applied to the winding terminals of the motor which are connected when the motor is running, to the alternating current supply. Usually, the braking is initiated directly after the motor has been switched off the supply. Since the magnetic field of the motor decays gradually, the alternating voltage remains maintained for some time, at the motor terminals, so that the alternating voltage generated by the motor is applied to the direct current supply. In many cases, this is disadvantageous, for example, if the direct current voltage is derived from a dry rectifier, i. e., a plate surface contact type rectifier, the danger is present, that the rectifier may rupture or at least become damaged due to the high alternating voltage which is many times that of direct voltage required for braking. This danger can be reduced, if the braking is not effected until some little time after the motor has been switched off the supply, after the alternating voltage has decreased to a low value. This is, however, generally inadmissible, because the braking, the very object of which is to stop the motor quickly, is thereby delayed. Also by temporarily short circuiting the motor terminals before connecting to the direct voltage, the collapse of the magnetic field of the motor and the decay of alternating voltage generated by the motor is delayed.

The invention relates to a connection for effecting dynamic braking of asynchronous motors and its object is to avoid the disadvantages of the braking methods utilized heretofore. In carrying the invention into effect in one form thereof direct voltage is supplied from the direct current supply to the points of the primary winding which possess like potential, with respect to the alternating voltage.

For a better and more complete understanding of the invention reference should now be had to the following specification and to the accompanying drawing in which Fig. 1 is a simple diagrammatical representation of an embodiment of the invention as applied to the primary windings of an asynchronous alternating current motor, and Fig. 2 is a simple diagrammatical illustration of the circumferential positions of the separate coils comprising the primary winding.

Referring now to the drawing, the primary winding of an asynchronous alternating current motor is illustrated as comprising two star connected groups of coils 1, 2 and 3, and 4, 5 and 6 connected in parallel with each other and having respective star points 7 and 8. The peripheral positions of these coils are diagrammatically illustrated in Fig. 2. These coils are arranged circumferentially to provide a winding having four magnetic poles. It will be understood that instead of six coils, the winding may comprise six groups of coils. The star points 7 and 8 of the coil groups are separated from each other.

The primary windings of the motor are supplied from a suitable poly-phase source of alternating voltage represented in the drawing by the three supply lines 9 to which the winding terminals are connected by suitable connections 10, 11 and 12. It will also be understood that suitable switching devices forming no part of the present invention are utilized for establishing the connections. These are illustrated conventionally as manually operated switching devices for the purpose of simplifying the drawing.

When it is desired to stop the motor, these switching devices are operated to interrupt the connections to the supply source. In order to stop the motor rapidly it is necessary to apply a braking force. However, since the primary windings are disconnected from the supply source, the magnetic flux would decay rapidly and thus there would be no dynamic braking of the motor. A braking force is produced by supplying a direct current to the primary winding thereby magnetizing the primary structure and causing a current to be induced in the secondary circuit which produces a very rapid braking action. As illustrated in Fig. 1, direct current is supplied to the star points 7 and 8 of the winding from a suitable source of direct voltage represented in the drawing by the source 13. Since the two star points 7 and 8 are points of equal potential with respect to the alternating voltage of these windings, at the instant the braking connections are established, this alternating voltage has no effect upon the direct current source 13. Although the direct current source 13 is conventionally illustrated as a pair of supply lines, it will be understood that in many cases the direct current supplied for braking purposes will be derived from suitable rectifying means, such for example, as a plate surface contact type rectifier. A rectifier of this type would be disadvantageously affected by the application of the high alternating voltage of the primary windings at the instant of establishment of the direct current braking connections.

When the primary windings are disconnected from the supply source 9 and the direct current source 13 is connected to the star points 7, 8 of the primary windings, a six pole stationary magnetic field results which produces a very rapid braking action and brakes the motor quickly to rest. With this connection, the four pole alternating magnetic field cannot apply any voltage at the direct current terminals.

Thus, currents of equal value flow in all portions of the winding so that during braking all portions of the winding are directed to equal thermal strain. This results in utilizing all of the winding to the greatest advantage. In some cases, however, it may be desirable to load different portions of the winding unevenly, or in order to simplify the connections, it may be desirable to connect only a portion of the winding to the direct current source without, however, departing from the invention.

Although in accordance with the provision of the patent statutes, this invention is illustrated in concrete form, it will be understood that it is not limited to the exact elements and connections shown and described for the purpose of illustration, since alterations and modifications will readily suggest themselves to persons skilled in the art without departing from the true spirit of the invention or the scope of the annexed claims.

What I claim as new and desire to secure by Letters Patent of the United States is:

1. In combination, an asynchronous alternating current motor having a plurality of groups of primary windings, each of said groups connected in star, and means for effecting dynamic braking of said motor comprising a source of direct current and means for connecting said source to points of said windings having equal potential with respect to the alternating voltage of said windings.

2. A system for braking an alternating current motor comprising an asynchronous alternating current motor having a plurality of groups of primary windings, the windings of each of said groups being connected in star, and means for effecting dynamic braking of said motor comprising connections including rectifying means from a source of alternating voltage to the star points of said groups of windings.

3. Means for braking an alternating current motor comprising a four pole, three phase asynchronous alternating current motor having two groups of primary windings, each group comprising three windings connected in star and means for dynamically braking said motor comprising a source of direct current and connections from said source to the star points of said winding groups to provide a six pole stationary magnetic field.

ERNST WOLFGANG KREBS.